United States Patent
Kantrowitz et al.

(10) Patent No.: US 6,353,650 B1
(45) Date of Patent: Mar. 5, 2002

(54) REDUCED IN-CORE INSTRUMENT PATTERNS FOR PRESSURIZED WATER REACTORS

(75) Inventors: Mark L. Kantrowitz, Portland; Dario Bollacasa, Weathersfield; Mo Chen Hsu, Windsor, all of CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/187,225

(22) Filed: Nov. 6, 1998

Related U.S. Application Data

(60) Provisional application No. 60/068,494, filed on Dec. 22, 1997.

(51) Int. Cl.[7] .................. G21C 17/00; G21C 17/108
(52) U.S. Cl. .................. 376/254; 376/245; 376/259
(58) Field of Search .................. 376/254, 245, 376/259, 260

(56) References Cited

U.S. PATENT DOCUMENTS

| | | | |
|---|---|---|---|
| 4,313,793 A | | 2/1982 | Klumb et al. ........... 376/260 |
| 5,024,801 A | * | 6/1991 | Impink, Jr. et al. ...... 376/217 |
| 5,229,006 A | * | 7/1993 | Impink, Jr. et al. ...... 376/258 |

FOREIGN PATENT DOCUMENTS

| | | | | |
|---|---|---|---|---|
| EP | 150096 | * | 7/1985 | ........ 376/254 |
| EP | 496998 | * | 8/1992 | ........ 376/254 |
| GB | 2 015 778 A | | 9/1979 | ........ 376/254 |
| JP | 05-196782 | * | 8/1993 | ........ 376/254 |

OTHER PUBLICATIONS

International Preliminary Examination Report (IPER) from International Preliminary Examination Authority, dated Apr. 11, 2000.
Endter, R.K. and Foster, R.G., "Effect of Inoperable In–Core Detectors on Core Monitoring System Accuracy," as published in *Nuclear Technology*, vol. 54, Aug. 1981, pp. 145–154.

* cited by examiner

*Primary Examiner*—Michael J. Carone
*Assistant Examiner*—Jack Keith

(57) ABSTRACT

A method for determining a reduced ICI patterns is provided to achieve core monitoring and surveillance and other required functions using fewer ICIs. Candidate ICI patterns having a reduced number of ICIs relative to the existing pattern are first selected according to predetermined selection considerations. After selection, the candidate patterns are evaluated according to predetermined evaluation criteria.

7 Claims, 8 Drawing Sheets

REDUCED IN-CORE INSTRUMENT PATTERNS FOR PRESSURIZED WATER REACTORS

CROSS-REFERENCED AND RELATED APPLICATIONS

This application is related to and claims priority on the basis of Provisional Application Serial No. 60/068,494, filed on Dec. 22, 1997, assigned to the assignee of the invention.

FIELD OF THE INVENTION

The present invention relates to pressurized water nuclear reactors (PWRs). More particularly, the present invention relates to reduced in-core instrumentation patterns for a pressurized water nuclear reactor.

BACKGROUND OF THE INVENTION

Pressurized water nuclear reactors are equipped with installations making for periodically and remotely measuring the neutron flux at certain points of the reactor core. Measuring instruments and sensors are installed in nuclear plants for the measurement of different types of radiation primarily neutrons and gamma rays). In addition, non-nuclear instrumentation is installed to measure process parameters, such as temperature, pressure, flow, and so on. Each instrument is part of a channel that comprises the sensor, a signal transmission line, amplifier, or other electronics, and meters, indicators, or recorders at the other end. The measured parameters can be channeled, according to type and importance, in different ways.

The power production level in a PWR is monitored through two instrumentation systems: the ex-core and the in-core instruments. The ex-core instruments measure gross neutron flux and hence total power level, whereas the in-core instruments measure local power levels. All ex-core neutron detectors are located in groups outside the reactor vessel, typically adjacent the inner side of the shielding wall. Each group of neutron detectors incorporates more than one unit to provide redundancy as mandated by regulatory requirements. These instruments are used at reactor start-up, when control rods are slowly withdrawn from the core, to determine neutron rate increases. Beside providing a neutron flux level indication, the signal is also fed to an electronic differentiating circuit that calculates the rate of change of neutron flux.

In-core instrumentation is used in PWRs to provide a more detailed picture of power levels inside the core. The local power density in nuclear reactors is often measured by the use of a plurality of these in-core detectors, each of which is contained in an elongated guide tube which guides the instrument through a nuclear fuel assembly. Together, the instrument and guide tube are typically called an in-core instrument or instrument assembly. The in-core instruments (ICI) are exposed to very high radiation levels and therefore may become very highly radioactive. This radioactivity makes the ICI tube and instrument extremely dangerous to handle when exhausted instruments are to be disposed of, usually during a reactor refueling outage. In-core instruments are also utilized in conventional PWRs for monitoring and surveillance functions on core power peaks and core power tilts, as well as for the detection of fuel misloadings. Specifically, the ICIs must permit the determination of core power peaks and core power tilts through each operating cycle such that any uncertainties in these calculated quantities are within limits that have been licensed for the plant by the United States Nuclear Regulatory Commission (USNRC). Also, the ICIs must enable the detection of misloading of any fuel assembly in the core at the beginning of each cycle of operation.

As noted above, the instrument is contained within a guide tube within the core. In order to avoid disturbing the core excessively, small channels and instruments must be used, usually of the self-powered very thin type. Various means of distributing these instruments throughout the core are known. In typical PWR cores, about 25% of the assemblies in the core incorporate instrument channels in which the instrument is inserted. Moreover, lead wire connections must be made to the instruments through various penetrations provided, either through the bottom or the top of the reactor vessel. The removal and transfer of exhausted ICIs during refueling is performed entirely under a sufficient depth of water to make use of the radiation shielding effect of the water. This requirement, however, often puts the ICI removal activities on the critical path during reactor refueling, especially in reactor installation where the ICIs enter the core through the top of the reactor vessel. Often, the only place in the reactor installation where sufficient water depth exists is directly over the reactor. Thus, the major refueling operations cannot be performed until the ICI replacement operation is completed. During a typical refueling, twenty to thirty ICIs must be individually removed and disposed of.

Finally, current ICI patterns include a significant level of redundancy to ensure that the ICIs can be used to carry out their intended functions in the event of unexpected ICI failures.

From the foregoing description, it can be appreciated that significant savings in refueling time and costs may be achieved if the number of ICIs is reduced.

SUMMARY OF THE INVENTION

It is an object of the present invention to provide a method for reducing the number of in-core instruments (ICIs) used in pressurized water reactors. It is a further object of this invention to reduce the number of ICIs while preserving the capability of the ICIs to perform all necessary functions.

It is another object of the invention to reduce the number of ICIs in operating plants to achieve initial capital and life cycle savings by reducing outage time, the amount of equipment necessary to support the ICI system, and the number of ICIs that would need to be replaced during the life of the plant.

According to the present invention, a method for determining a reduced ICI pattern is provided based upon the considerations recommended by the USNRC for inclusion in and evaluation of changes to the ICI system made in accordance with appropriate federal regulations (10 C.F.R. 50.59). According to the inventive method, candidate ICI patterns having a reduced number of ICIs relative to the existing pattern are first selected. After selection, the candidate patterns are evaluated to ensure that any differences between the predicted core power distributions and those synthesized from the reduced ICI patterns are in compliance with the limits that have been licensed for a particular PWR. The candidate patterns are also evaluated to ensure that the reduced number of ICIs provides the capability to detect misloading of a fuel assembly into an improper location. Finally, the candidate ICI patterns are evaluated to ensure that the reduced ICI patterns are still functional within the current Technical Specification ICI operability limit. Currently, the Technical Specification requires full function of the ICIs when only 75% of the ICIs are operable, in accordance with plant requirements.

Reducing the number of ICIs that must be replaced every few cycles of operation leads to a reduction in the number of ICIs that would need to be replaced over the life of a plant. As a result, significant savings could be achieved in life cycle costs for the ICI system, resulting from savings in both hardware replacement costs and hardware disposal costs. In addition, because fewer ICIs would have to be replaced during each refueling outage, savings in plant outage time and reductions in radiation exposure to plant personnel are also achieved. Finally, reducing the number of ICIs in plants that have not yet been built would provide additional reductions in the equipment needed to support the ICI system. As a result, significant reductions in overall capital costs for new PWRs as well as reduced operating and maintenance costs for these plants could be achieved.

BRIEF DESCRIPTION OF THE DRAWINGS

The features and inventive aspects of the present invention will become more apparent upon reading the following detailed description, claims, and drawings, of which the following is a brief description.

FIGS. 1–8 illustrate examples of the reductions in the required number of ICIs that may be achieved using the methodology of the present invention. Specifically, FIG. 1 shows the current and reduced ICI patterns for a 241 fuel assembly core having an original ICI pattern of 61 ICIs and a reduced ICI pattern of 49 ICIs;

FIG. 2 shows the current and reduced ICI patterns for a 217 fuel assembly core having an original ICI pattern of 56 ICIs and a reduced ICI pattern of 44 ICIs;

FIG. 3 shows the current and reduced ICI patterns for a 217 fuel assembly core having an original ICI pattern of 45 ICIs and a reduced ICI pattern of 35 ICIs;

FIG. 4 shows the current and reduced ICI patterns for a 217 fuel assembly core having an original ICI pattern of 45 ICIs and a reduced ICI pattern of 35 ICIs, different from those in FIG. 3;

FIG. 5 shows the current and reduced ICI patterns for a 217 fuel assembly core having an original ICI pattern of 45 ICIs and a reduced ICI pattern of 35 ICIs, both of which are slightly different from those in FIGS. 3 and 4;

FIG. 6 shows the current and reduced ICI patterns for a 177 fuel assembly core having an original ICI pattern of 45 ICIs and a reduced ICI pattern of 39 ICIs;

FIG. 7 shows the current and reduced ICI patterns for a 177 fuel assembly core having an original ICI pattern of 44 ICIs and a reduced ICI pattern of 36 ICIs; and FIG. 8 shows the current and reduced ICI patterns for a 133 fuel assembly core having an original ICI pattern of 28 ICIs and a reduced ICI pattern of 25 ICIs.

DESCRIPTION OF THE PREFERRED EMBODIMENT

The methodology of the present invention for determining reduced in-core instrumentation (ICI) patterns is grounded in considerations recommended by the United States Nuclear Regulatory Commission (USNRC) for inclusion in and evaluation of changes to the ICI system. These considerations are made in accordance with federal regulations, specifically, 10 C.F.R. 50.59. The considerations outlined by the USNRC include the following:

1. Detecting inadvertent loading of a fuel assembly into an improper location;
2. Insuring the validity of core power tilt estimates;
3. Maintaining adequate core coverage by instrumentation;
4. Limiting measurement uncertainties to meet plant Technical Specification limits for various measured values, including measured peak linear heat rates, peak pin powers, radial peaking factors, and azimuthal tilts; and
5. Restoring ICI system to full open (or nearly full) service at the beginning of each fuel cycle.

Utilizing these considerations, determination of the reduced ICI patterns according to the present inventive methodology includes two main parts. First, candidate ICI patterns having a reduced number of ICIs relative to the existing ICI patterns are selected according to specific selection considerations. Second, the selected candidate ICI patterns are evaluated according to specific criteria.

According to the first part of the inventive methodology, candidate ICI patterns having a reduced number of ICIs must be selected. In order to guide selection of the candidate ICI patterns according to the inventive methodology, selection considerations were established to ensure that reduced patterns of ICIs are capable of performing all functions required of a full complement of ICIs. The functions required of the reduced ICI patterns include:

i. maintaining the core power tilt measurement capability;
ii. providing the capability to perform ex-core detector calibrations;
iii. providing full core coverage;
iv. detecting fuel misloadings;
v. detecting misalignment of the lead control rod bank; and
vi. providing sufficient redundancy.

First, a reduced ICI pattern maintains core power tilt measurement capability by retaining all ICIs from the existing ICI pattern that belong to tilt groups. In this way, core power tilt measurement capability is not affected by the reduced ICI pattern, because all tilt-related ICIs are retained.

Second, the integrity of ex-core detector calibrations is maintained by retaining all ICIs from the existing ICI pattern that provide information about the power distribution in those fuel assemblies that contribute most of the neutron flux impinging on the ex-core detectors. By maintaining measurement capability within those fuel assemblies that contribute most neutron flux to the ex-core detectors, comparisons may be made between the retained ICIs and the ex-core detectors to provide full ex-core detector calibration.

Third, full core instrumentation coverage is not impacted through the use of a reduced ICI patterns because those ICIs that provide a uniform distribution of instrumented fuel assemblies from the periphery of the core to the center of the core, in all core quadrants, are retained. In other words, by maintaining a uniform distribution of ICIs, though the number is reduced, full core instrumentation coverage is still provided through the present invention.

Fourth, fuel misloadings must be detected by the reduced ICI pattern. According to the inventive method, fuel assembly misleading detection capability of the reduced ICI patterns is verified by simulating fuel misloading during the ICI pattern evaluation process. The evaluation process is discussed in more detail below.

Fifth, reduced ICI patterns maintain the capability to detect misalignment of the lead control rod bank. This capability is ensured by retaining those ICIs that are sufficiently close to a control rod location to enable detection of any perturbation in the power distribution associated with movement of the lead control rod bank. By retaining those ICIs that are in a position to detect power distribution changes caused by movement of the lead control rod bank, misalignment of the lead control rod bank is easily detected.

Lastly, redundancy of the reduced ICI patterns are proven by evaluating the performance of the reduced ICI patterns in combination with unexpected ICI failures to prove that the reduced ICI patterns still perform their intended functions. The various evaluations are discussed in more detail below.

Once a reduced ICI pattern has been selected based upon meeting the various selection considerations set forth above, the reduced ICI pattern configuration is evaluated to ensure that any differences between the predicted core power distributions and those synthesized from the reduced ICI patterns are within licensed limits for the plant. Moreover, the reduced ICI patterns are evaluated to prove that the reduced ICI patterns are able to detect misleading of an improperly located fuel assembly. Further, the reduced ICI pattern is tested with only 75% of the ICIs operable and is forced to meet the full evaluation criteria, even though 25% of the ICIs are inoperable.

Thus, under the evaluation portion of the methodology of the present invention, candidate patterns are evaluated according to the following criteria:

A. The differences between the predicted core power distributions and those synthesized from the reduced ICI patterns must be in compliance with the limits that have been licensed for the plant;

B. The reduced ICI patterns must provide the capability of detecting the misloading of a fuel assembly placed into an improper location; and C. The reduced ICI patterns must be capable of performing all intended functions with only 75% of the ICIs operable, in accordance with the plant Technical Specification.

In order to determine that power distribution uncertainties are within licensed limits, comparisons are performed of predicted power distributions obtained for design calculations with measured power distributions obtained from ICI detector signals using accepted licensed methodologies. Two types of uncertainty are evaluated: basic measurement uncertainty and the synthesis uncertainty. Basic measurement uncertainty relates to the local power in instrumented fuel assemblies. Synthesis uncertainty is associated with extrapolating power calculations to non-instrumented fuel assemblies. In order for a reduced ICI pattern to be acceptable, both calculated basic measurement uncertainty and synthesis uncertainty must be within the limits licensed for the plant.

In the second part of the evaluation, candidate ICI patterns that satisfy the uncertainty analysis are tested to ensure the ability to detect fuel misloadings. Testing of the fuel misloading detection ability with a reduced ICI pattern is verified by simulating a spectrum of fuel misloadings and examining the differences in the power distributions between a properly loaded core and a simulated misloaded core, as measured by the reduced ICI pattern. Such simulations may be performed using conventionally known simulation techniques. In order to be acceptable, the differences in power distributions obtained from ICI detector signals for the properly loaded core and the simulated misloaded core must be discernable. If the differences are discernable, it is assumed that the reduced ICI pattern is able to detect fuel misloadings.

Finally, each reduced ICI pattern is evaluated for its capability to perform its intended functions under a 75% operability Technical Specification requirement. That is, each reduced ICI pattern is further reduced to 75% of the reduced pattern number to demonstrate that the reduced ICI pattern can perform its intended functions with only 75% of the ICIs operable. The ICI operability limit is derived from the plant Technical Specification and the plant license. Existing plant Technical Specifications set forth a 75% ICI operability limit. If the ICI operability limit is ever changed, e.g. increased to 90% or decreased to 70%, then each reduced ICI pattern would be evaluated for its capability to perform its intended functions under that particular Technical Specification ICI operability limit.

Figure 1:
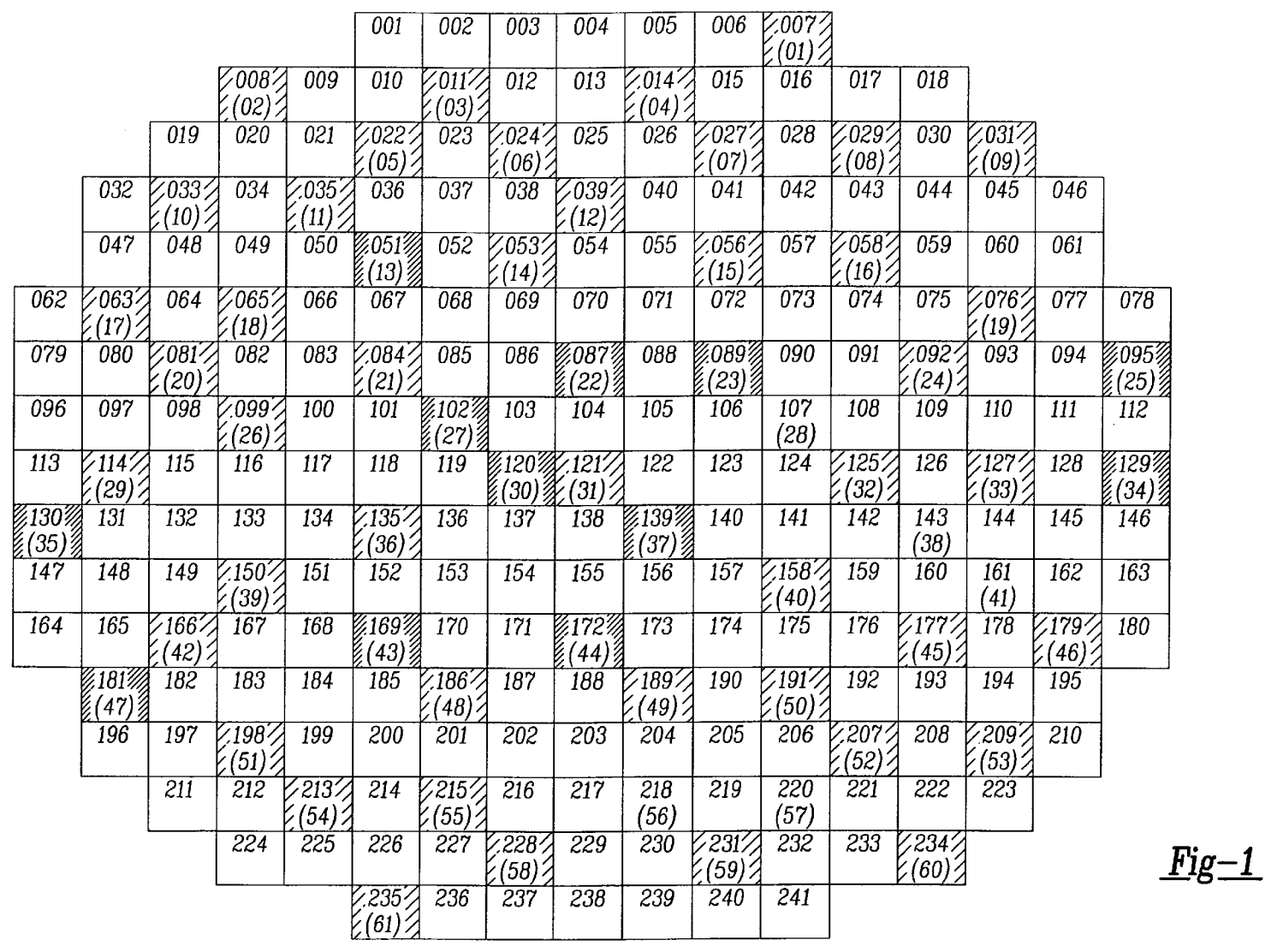

Applying the methodology described above, several reduced ICI patterns have been determined to be acceptable for various core configurations. Several of these acceptable reduced ICI patterns are set forth below as examples and are shown in FIGS. 1–8. It should be understood that the following Examples are exemplary only, and do not limit the scope of the invention in any way.

In FIGS. 1–8, boxes representing fuel assemblies that contain an ICI in existing cores of this configuration are shown with both light and dark cross-hatching, and include a corresponding numeric designation in parentheses. Those boxes including dark cross-hatching correspond to those assemblies from which an ICI has been removed using the methodology of the present invention. Thus, those boxes including light cross-hatching correspond to those assemblies wherein ICIs have not been removed.

EXAMPLE #1.

FIG. 1 shows a plan diagram of a 241 fuel assembly PWR core. Under existing plant designs, a 241 fuel assembly core would ordinarily have an existing ICI pattern of 61 ICIs distributed as shown in FIG. 1. Using the methodology described herein, 12 ICIs (numbers 13, 22, 23, 25, 27, 30, 34, 35, 37, 43, 44 and 47) are removed, leading to a reduced ICI pattern of 49 ICIs. The net ICI reduction in FIG. 1 by the claimed methodology is 20%.

EXAMPLE #2.

A 217 fuel assembly core is shown having an original ICI pattern of 56 ICIs. Using the methodology described herein, 12 ICIs (numbers 2, 4, 9, 15, 18, 20, 37, 39, 42, 48, 53 and 55) are removed from the core. The reduced ICI pattern thereby includes only 44 ICIs, for a net reduction of 21%

EXAMPLE #3.

Figure 2:
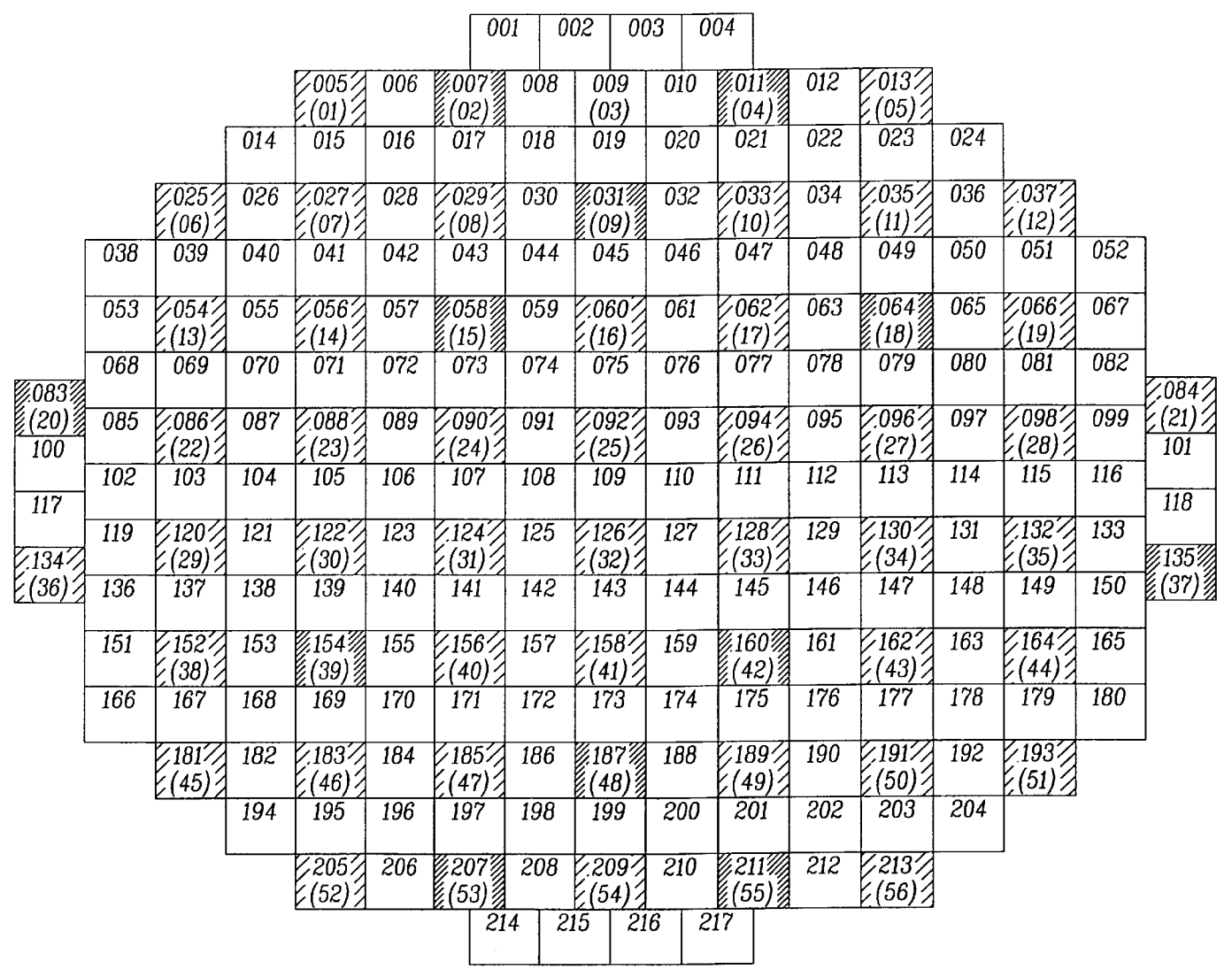
Figure 3:
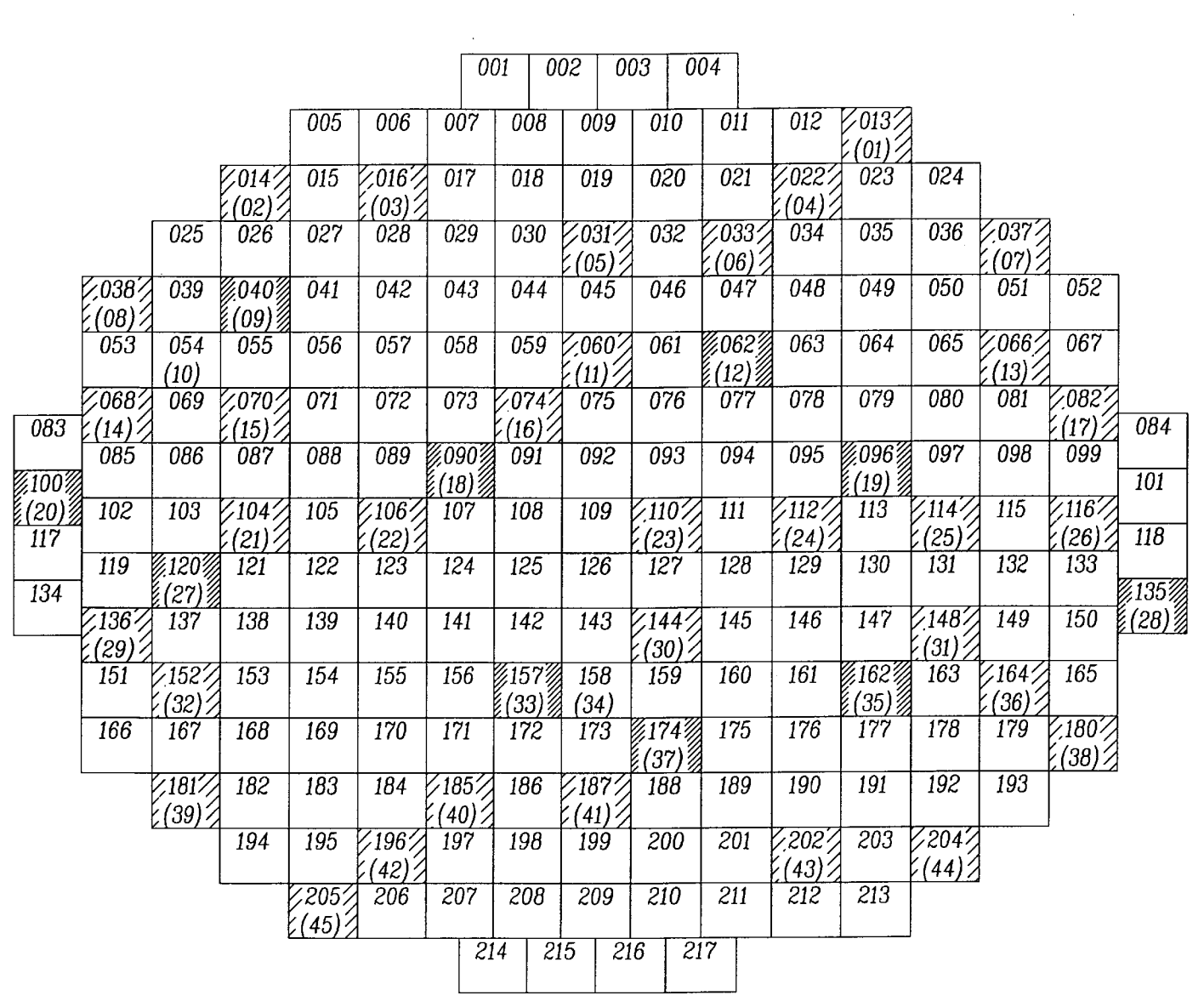

FIG. 3 shows an alternative 217 fuel assembly core configuration having an original ICI pattern of 45 ICIs. The original ICI pattern in FIG. 3 is different from that shown in FIG. 2. Using the methodology described herein, 10 ICIs (numbers 9, 12, 18, 19, 20, 27, 28, 33, 35 and 37) are removed from the core, yielding a reduced ICI pattern of 35 ICIs, for a net reduction of 22%.

EXAMPLE #4.

Figure 4:
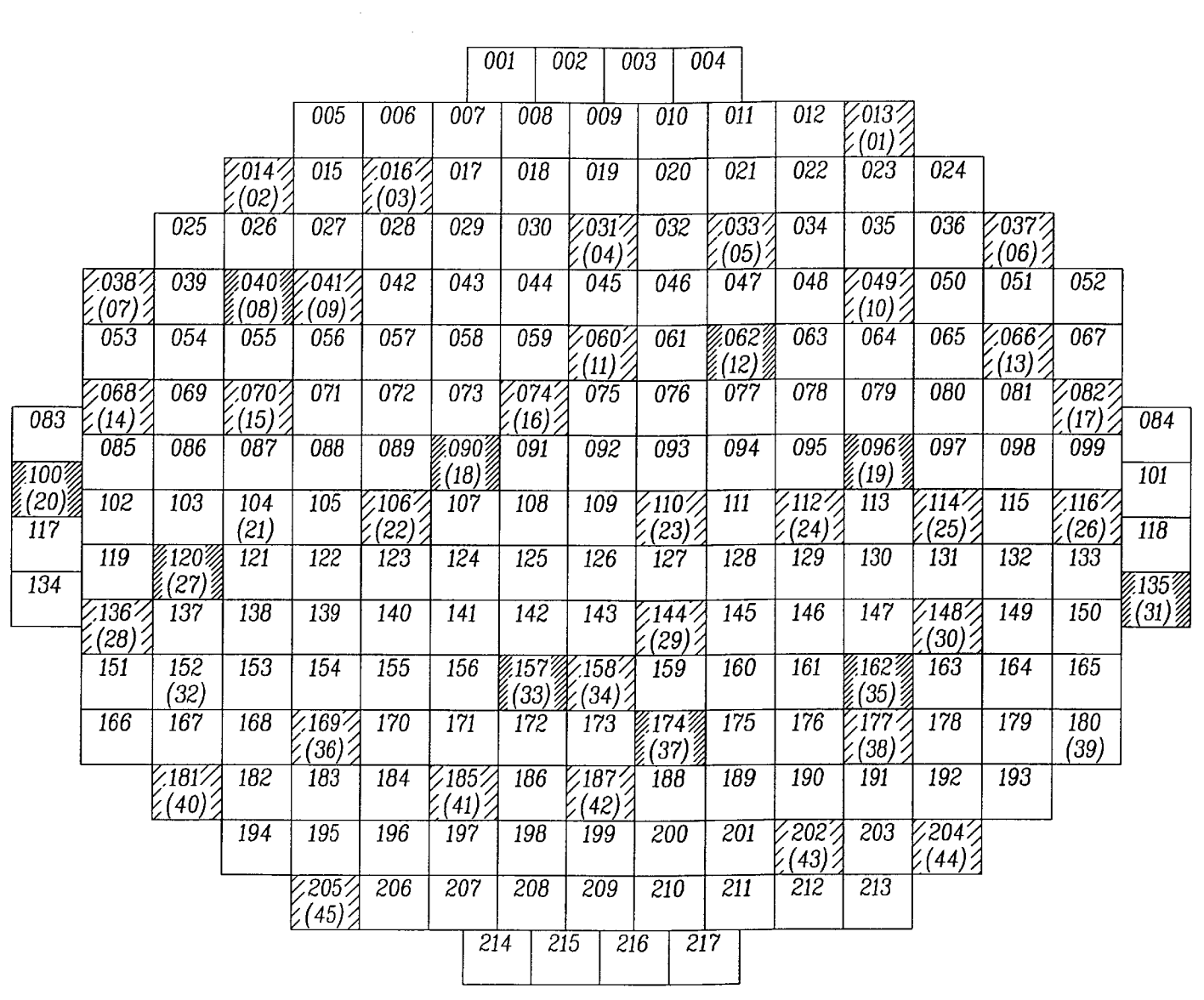

In FIG. 4, another configuration is shown for a 217 fuel assembly core with an original ICI pattern of 45 ICIs. Again, the existing ICI pattern shown in FIG. 4 is different from the patterns of either FIGS. 2 or 3. Using the inventive methodology, 10 ICIs (8, 12, 18, 19, 20, 27, 31, 33, 35 and 35) are removed, yielding a reduced ICI pattern of 35 ICIs is shown, yielding a reduction of 10 ICIs, or 22%.

EXAMPLE #5.

Figure 5:
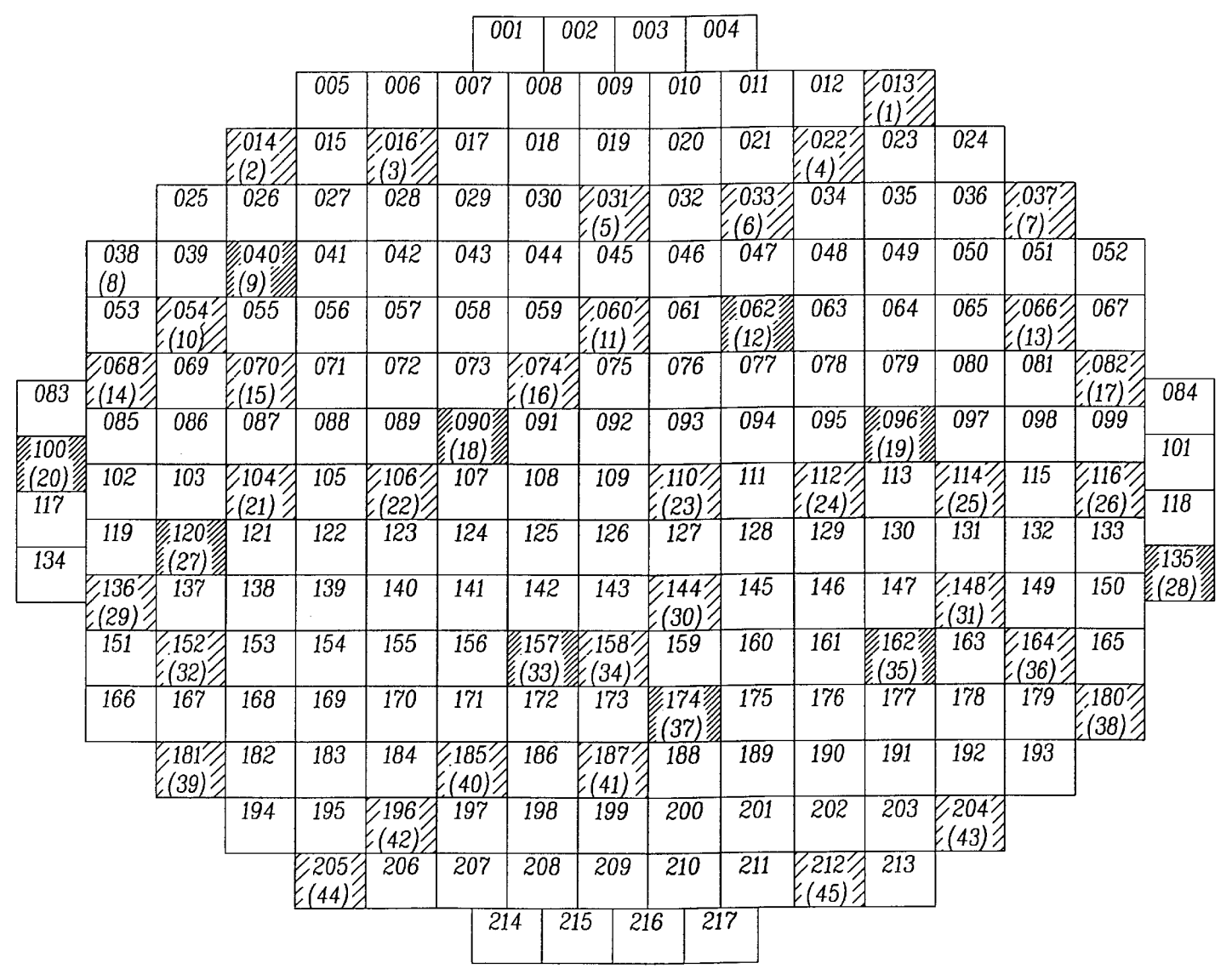

In FIG. 5, another 217 fuel assembly core pattern is shown having a 45 ICI original pattern that is different from that shown in either FIGS. 2, 3 or 4. Using the inventive methodology, 10 ICIs (9, 12, 18, 19, 20, 27, 28, 33, 35 and 37) are removed, yielding a reduced ICI pattern of 35 ICIs, yielding a net reduction of 22%.

EXAMPLE #6.

Figure 6:
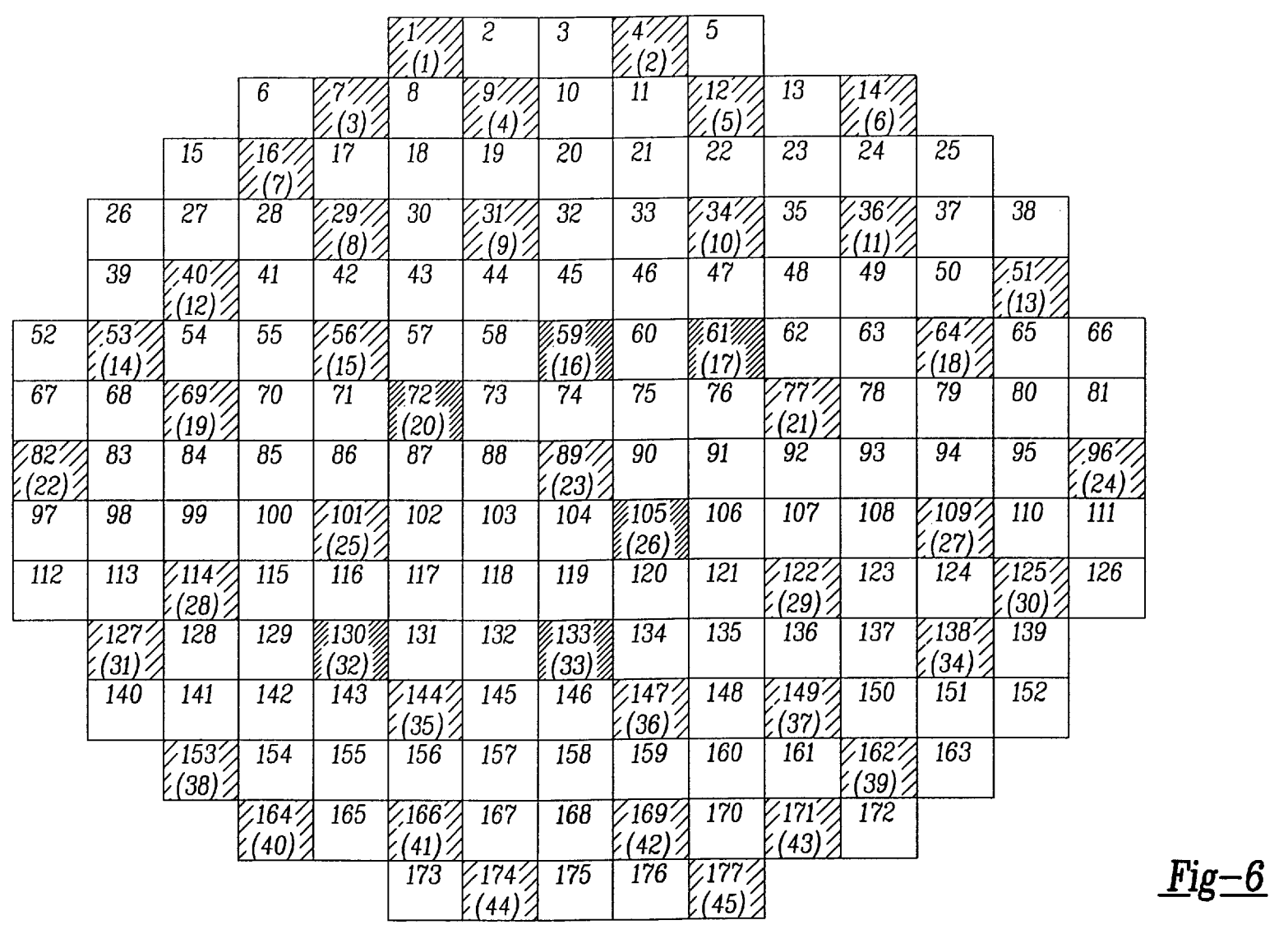

In FIG. 6, a 177 fuel assembly core is shown that includes an original ICI pattern of 45 ICIs. Using the inventive methodology, 6 ICIs (16, 17, 20, 26, 32 and 33) are removed, reducing the number of ICIs to 39, yielding a net reduction of 13%.

EXAMPLE #7.

Figure 7:
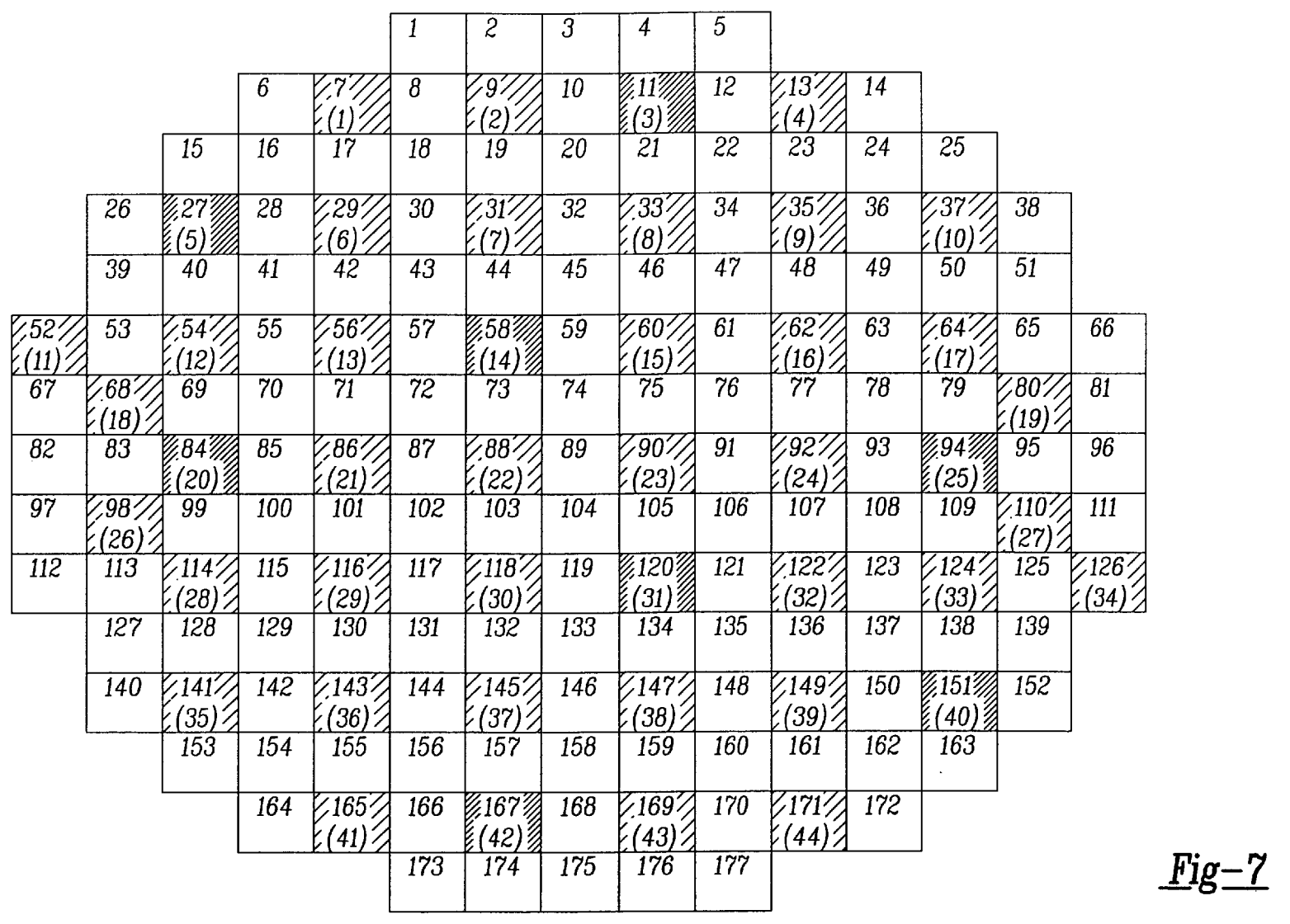

In FIG. 7, another 177 fuel assembly core configuration is shown having an original ICI pattern of 44 ICIs. Using the inventive methodology, the number of ICIs is reduced by 8 (Numbers 3, 5, 14, 20, 25, 31, 40 and 42) to 36 ICIs, yielding a net reduction of 18%.

EXAMPLE #8.

Figure 8:
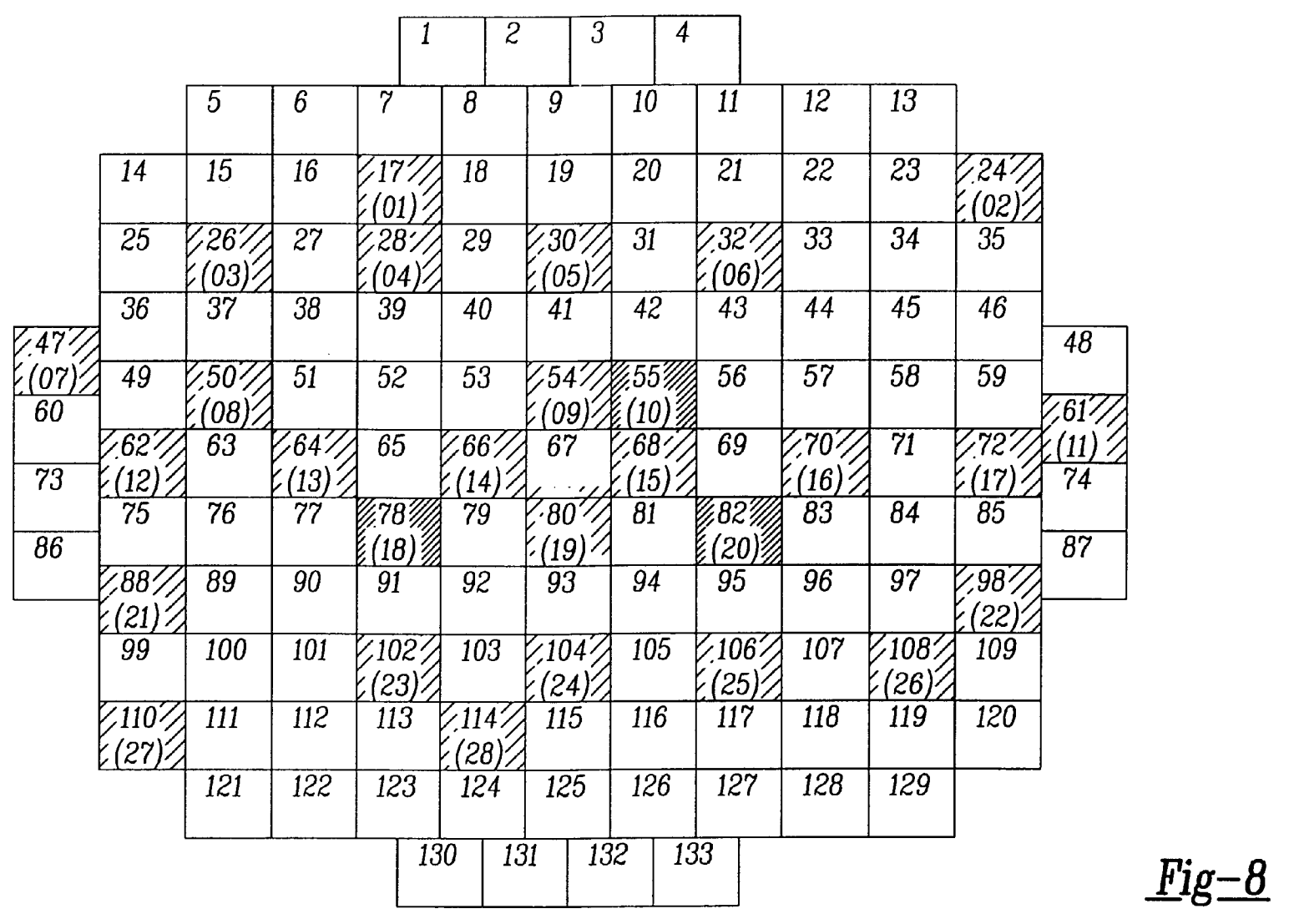

FIG. 8 shows a 133 fuel assembly core having an original ICI pattern of 28 ICIs. Using the inventive methodology, the number of ICIs is reduced by 3 (Numbers 10, 18 and 20), yielding a net reduction of 11%.

In each of examples 1–8, the reduced ICI patterns shown satisfy all requirements of the ICI system while providing substantial reductions in the number of ICIs. Reducing the number of ICIs reduces both plant operating and maintenance costs. If the present methodology is implemented during new plant construction, the amount of additional equipment necessary to support the ICI system would be reduced because fewer ICIs would have to be supported. As a result, a significant reduction in overall capital cost due to construction as well as due to operating and maintenance is realized through implementation of the present invention. Moreover, associated costs from reactor down time during refueling outages may be reduced because a shorter time needed to replace a reduced complement of ICIs. Moreover, because the time along the critical path is correspondingly reduced, potential radiation exposure to plant personnel is also reduced.

Various embodiments of this invention have been disclosed. But it should be realized that the various changes and modifications that are possible will be self-evident to those of skill in the art in which the present invention pertains, and may be made without departing from the scope of the invention, which is limited only by the appended claims.

What is claimed is:

1. A method for reducing in-core instrumentation within an in-core instrumentation pattern in a reactor core of a pressurized water reactor, said pattern having a plurality of in-core instruments contained therein, the method comprising:

removing at least one of said plurality of in-core instruments from within said pattern while retaining (i) each of said plurality of in-core instruments that belong to at least one tilt group, (ii) each of said plurality of in-core instruments that provide information about power distributions in those assemblies that contribute most neutron flux to ex-core detectors, (iii) a uniform distribution of instrumented fuel assemblies from the periphery of said reactor core to the center and in each quadrant of said reactor core, (iv) said plurality of in-core instruments such that misloading of a fuel assembly in any location is detected by at least one of said plurality of in-core instruments, and (v) said plurality of in-core instruments such that at least one in-core instrument is sufficiently close to a control rod location to enable detection of a perturbation in the power distribution associated with movement of a lead control rod bank, thereby forming a reduced pattern; and evaluating the performance of said reduced pattern against at least one predetermined performance criterion.

2. The method of claim 1, wherein said at least one predetermined performance criterion includes ensuring that differences between predicted core power distributions and core power distributions synthesized from said reduced number of said plurality of in-core instruments fall within licensed limits of the pressurized water reactor.

3. The method of claim 2, wherein said at least one predetermined performance criterion is achieved when a basic measurement uncertainty and a synthesis uncertainty fall within licensed limits of the pressurized water reactor, said pressurized water reactor containing said reactor core.

4. The method of claim 1, wherein a second said at least one predetermined performance criterion includes ensuring that said reduced pattern provides the ability to detect fuel misloadings.

5. The method of claim 4, wherein said at least one predetermined performance criterion is achieved when power distribution differences obtained from detector signals from said plurality of in-core instruments for a properly loaded core are discernable from power distribution differences from a simulated misloaded core.

6. The method of claim 1, wherein the step of removing further comprises: reducing the number of operable said at least one of said plurality of in-core instruments by about 25%.

7. The method of claim 1, wherein said evaluating step further comprises:

(i) evaluating said candidate pattern to minimize power distribution measurement uncertainties;

(ii) ensuring that said reduced pattern provides the ability to detect fuel misloadings; and (iii) insuring operability of said candidate pattern with 25% of the reduced pattern inoperable.

* * * * *